July 6, 1926.                                                    1,591,835
H. B. JOHNSTON
PISTON AND PISTON RING
Filed August 9, 1920

INVENTOR
*Harry B. Johnston*
BY
*Walter W. Burns*
ATTORNEY

Patented July 6, 1926.

1,591,835

UNITED STATES PATENT OFFICE.

HARRY B. JOHNSTON, OF SEATTLE, WASHINGTON.

PISTON AND PISTON RING.

Application filed August 9, 1920. Serial No. 402,241.

My invention relates to pistons and piston rings and has particular relation to piston and piston rings in those types of fluid engines where it is desired to obtain a tight seal between the piston and the wall of the cylinder.

An object of my invention is the provision of a piston ring which is so shaped that when it is installed in a suitable groove of a piston, the pressure at one end of the piston will cause the ring to expand against the wall of the cylinder and cause a tight seal between the piston and cylinder wall, even though the cylinder through uneven wear has become out of round.

Another object of my invention is the provision of a piston and ring construction wherein the piston is provided with a groove having an inclined wall, and free communication to the space at one end of the cylinder and wherein the ring conforms to the groove and has a section which contains a plurality of splits to permit the ring to conform to a cylinder which has been worn away more at one side than the other and has become out of round.

Another object of my invention is the provision of a piston and ring construction wherein the piston of the ordinary type may have its groove or grooves enlarged and provided with a ring securely fastened at one side thereof, the ring having an inclined surface to cooperate with a similar inclined surface on the ring, the ring being provided with a plurality of sections, one of the ring sections being provided with a plurality of splits.

Referring particularly to the drawing where preferred embodiments are illustrated:—

Figure 1:
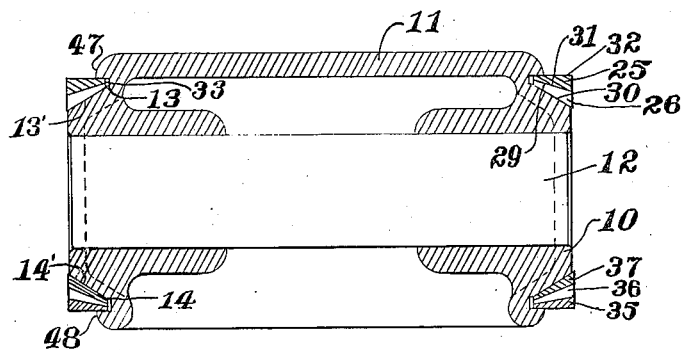
Figure 1 illustrates a cross section of a piston showing a two section ring above and a three section ring below.
Figure 3:
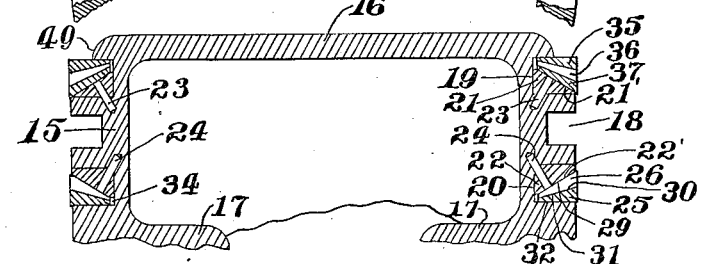
Figure 3 is a fragmental cross sectional view of a usual type of piston showing a method of adapting it for use with my invention.
Figure 5:
Figure 6:
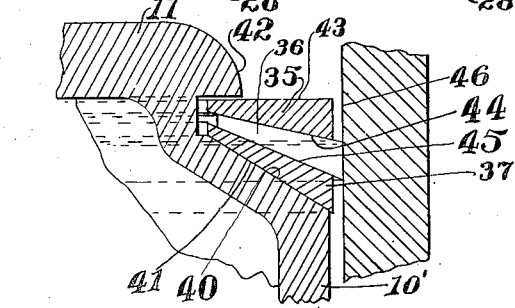
Figure 6 is an enlarged fragmental view of a ring having three sections and showing the cylinder wall, the clearance between the piston and cylinder wall being exaggerated to show the action of the ring section having a plurality of splits.

In Figures 1, 3 and 6 the cross section is shown using splits in the sections 26 and 36 such as shown in Figure 5, to avoid a more complex showing.

Referring particularly to Figure 1, 10 designates a piston having a head 11 and a wrist connection 12. 13 and 14 designate the respective grooves of the piston 10, each of which has an inclined wall as shown at 13' and 14'.

Referring to Figure 3, 15 designates a piston of a common type but with my invention installed therein. 16 is the head of the piston 15, and 17 the bosses for the wrist connection. 18 designates the ordinary rectangular groove of which there were three before the alterations were made. 19 and 20 designate grooves which are enlarged as shown and rings 21 and 22 installed therein and secured by any suitable fastening means as the pins 23, 24 respectively. The rings 21 and 22 are provided with inclined walls 21' and 22' respectively which form the inclined wall for the piston ring to seat upon.

Figure 2:
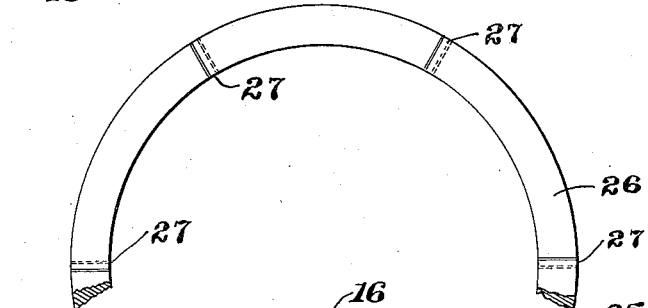
Figure 2 is a fragmental plan view of the ring section having a plurality of splits therein.

As the piston ring in the upper groove of Figure 1 and the lower groove of Figure 2 are similar in construction, the same reference characters will be used in the description of both rings.

Figure 4:
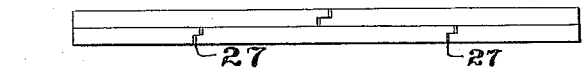
Figures 4 and 5 are side views of a ring such as that shown in the upper groove of Figure 1 or the lower groove of Figure 3 or two sections of the ring of the lower groove of Figure 1 or upper groove of Figure 3 and illustrating two different forms of splits.

25 and 26 designate the ring sections; 26 being split such as by a plurality of step joints as shown at 27 in Figures 2 and 4 or by a diagonal split as 28 in Figure 5 or by any suitable split. The ring section 25 is preferably made with outward spring tension.

Opposite walls 29, 30 of the ring section 26 are preferably outwardly diverging so that the pressure on the ring section 25 will cause an outward movement of the separate parts of the section 26. In the embodiment of 25 illustrated, the opposite walls 31 and 32 are shown as outwardly diverging and the wall 32 is in a plane.

Carbon spaces 33 and 34 are provided at the rear of the upper ring of Figure 1 and the lower ring of Figure 3 respectively.

As the lower ring of Figure 1, and the upper ring of Figure 2 and the ring of Figure 6 are similar in construction, the same reference characters will be used in the description of both rings.

These rings comprise sections 35, 36 and 37. The sections 35 and 37 are split preferably once although the invention is not limited to a structure wherein these rings contain a single split. The section 36 contains a plurality of suitable splits such as those illustrated in Figures 4 and 5. The opposite walls of the sections 35 and 37 are shown as being outwardly diverging although this feature is not necessary to the operation of the section 36 to cause a tight seal. When the sections 35 and 37 are made with a single split, they are preferably made with outward spring tension.

I will now describe the operation of my invention.

Often due to any one or more of several causes, the cylinder wall has portions which are slightly out of round. As stated in the objects of my invention, I desire to be able to secure a tight seal under these conditions although it will work very well in cylinders which are not out of round.

I refer now particularly to Figure 6 where I have shown a ring similar to the ring in the lower groove of Figure 1 and upper groove of Figure 3 but installed in a groove similar to the upper groove of Figure 1. The ring sections 35, 36 and 37 of the ring each have coacting sides with the adjacent rings and the side 40 of the ring section 37 cooperates with the wall 41 of the groove.

When the fluid pressure at the end of the piston 10' passes the cut away portion 42 of the head 11' and comes in contact with the face 43 of the ring section, the outwardly diverging sides 44 and 45 cause the ring section 36 to be forced out against the wall 46 of the cylinder. Due to the fact that the ring section 36 is in a plurality of pieces because of the plurality of splits, the pieces will be forced out against the cylinder wall even in an out of round cylinder. The sections 35 and 37 are also forced outwardly against the cylinder wall although in an out of round cylinder, the pieces of the ring section 36 would reach the cylinder wall all the way round and at a more even pressure.

The piston of Figure 1 is cut away at 47 and 48 and the piston of Figure 3 is cut away at 49 to permit the fluid pressure to more readily reach the rings to cause the same to expand. As this pressure reaches the ring, the ring, because of the splits and the inclined wall of the groove, is caused to expand as a whole. The ring as a whole is preferably made having a greater radial thickness than axial thickness.

It is to be understood that while the cut away portions 47, 48 and 49 are described as such this is not intended as a limitation as to the method of manufacture.

While I have described my invention in detail and have shown in Figure 3 such a piston as might be used in an internal combustion motor, I desire to have it understood that my invention is adapted for use in fluid engines generally, and that modifications and changes may be made without departing from the spirit of my invention and within the scope of the appended claims.

Having described my invention what I claim is:—

1. A piston ring having outwardly diverging surfaces of unequal inclination relative to a plane perpendicular to the axis of the ring and comprising a plurality of ring sections, one of the ring sections having a plurality of splits, another of the sections having a single split.

2. A piston ring having outwardly diverging surfaces and having a greater radial thickness than axial thickness and, comprising a plurality of ring sections, one of the ring sections having a plurality of splits, and another section having a single split.

3. A piston ring having an inclined surface and a surface opposite the inclined surface and substantially in a plane, the ring comprising a plurality of ring sections, the sides of adjacent sections toward one side of the ring being inclined at a different angle to the plane of the ring, one of the ring sections having a plurality of splits, the ring having a greater radial thickness than axial thickness.

4. A piston ring comprising a plurality of ring sections, one of the sections having a plurality of splits and being located between two other sections, the ring having a greater radial thickness than axial thickness.

5. A piston ring having an inclined surface and a surface opposite the inclined surface and lying substantially in a plane, the ring comprising a plurality of ring sections, one of the ring sections having a plurality of splits and having outwardly diverging surfaces, the ring having a greater radial thickness than axial thickness.

6. In combination, a piston having a groove with an inclined wall and a ring in the groove, the ring having outwardly diverging surfaces, one of which contacts with the inclined wall, the ring comprising a plurality of ring sections, one of the ring sections having a plurality of splits, the ring having a greater radial thickness than axial thickness.

7. In combination, a piston having a groove with an inclined wall and a ring in the groove, the ring having an inclined surface in contact with the inclined wall and a surface opposite the inclined surface and substantially in a plane, the ring comprising a plurality of ring sections, one of the ring sections having a plurality of splits, the ring having a greater radial thickness than axial thickness.

8. In combination, a piston having a groove and a ring in the groove, the ring comprising a plurality of ring sections, two of which have outwardly diverging surfaces and one of which has a plurality of splits, the ring having a greater radial thickness than axial thickness.

9. In combination, a piston having a groove and a ring in the groove, the ring comprising a plurality of ring sections, one of the sections having a plurality of splits and being located between two other sections, the ring having a greater radial thickness than axial thickness.

10. In combination, a piston having a groove with an inclined wall and a ring in the groove, the ring having outwardly diverging surfaces, one of which is in contact with the inclined wall, the ring comprising a plurality of ring sections, one of the ring sections having a plurality of splits and having outwardly diverging surfaces, and another section having a single split, the ring having a greater radial thickness than axial thickness.

11. In combination, a piston having a groove with an inclined wall and a ring in the groove, the ring having outwardly diverging surfaces, one of which contacts with the inclined wall, the ring comprising a plurality of ring sections, one of the ring sections having a plurality of splits, and another section having a single split, the piston having a cut away portion between the ring and the space beyond the end of the piston to permit the fluid under pressure to reach the ring.

12. In combination, a piston having a groove with an inclined wall and a ring in the groove, the ring having an inclined surface in contact with the inclined wall and a surface opposite the inclined surface and substantially in a plane, the ring comprising a plurality of ring sections, one of the ring sections having a plurality of splits, and another section having a single split, the piston having a cut away portion between the ring and the space beyond the end of the piston to permit the fluid under pressure to reach the ring.

13. In combination, a piston having a groove and a ring in the groove, the ring comprising a plurality of ring sections, two of which have outwardly diverging surfaces, the corresponding surfaces of two sections lying at different angles to the axis of the ring, one of the sections having a plurality of splits, the piston having a cut away portion between the ring and the space beyond the end of the piston to permit the fluid under pressure to reach the ring.

14. In combination, a piston having a groove and a ring in the groove, the ring comprising a plurality of ring sections, one of the sections having a plurality of splits and being located between two other sections, the piston having a cut away portion between the ring and the space beyond the end of the piston to permit the fluid under pressure to reach the ring.

15. In combination, a piston having a groove and a ring in the groove, the ring comprising a plurality of ring sections, one of the sections located between two other sections and having a plurality of splits and having outwardly diverging surfaces, the piston having a cut away portion between the ring and the space beyond the end of the piston to permit the fluid under pressure to reach the ring.

16. In combination, a piston having a groove and a ring in the groove, the ring comprising a plurality of ring sections, the corresponding surfaces of two sections lying at different angles to the axis of the ring, one of the ring sections having a plurality of splits and having outwardly diverging surfaces, the piston having a cut away portion between the ring and the space beyond the end of the piston to permit the fluid under pressure to reach the ring.

17. In combination, a piston having a groove with an inclined wall and a ring in the groove, the ring having outwardly diverging surfaces, one of which is in contact with the inclined wall, the ring comprising a plurality of ring sections, one of the ring sections having a plurality of splits and having outwardly diverging surfaces, another of the sections having a single split, the piston having a cut away portion between the ring and the space beyond the end of the piston to permit the fluid under pressure to reach the ring.

18. In combination, a piston having a groove with an inclined wall and a ring in the groove, the ring having an inclined surface in contact with the inclined wall of the groove, and having a surface opposite the inclined surface and lying substantially in a plane, the ring comprising a plurality of ring sections, one of the ring sections having a plurality of splits and having outwardly diverging surfaces, another of the sections having a single split the piston having a cut away portion between the ring and the space beyond the end of the piston to permit the fluid under pressure to reach the ring.

19. In combination, a piston having an annular groove, a ring of substantially triangular cross section and immovably secured in the groove, one of the surfaces of the ring forming a wall of a piston ring groove, the piston ring groove having an inclined side wall and a piston ring in the groove, the piston ring having an inclined surface cooperating with the inclined wall of the piston ring groove.

20. In combination, a piston having an annular groove, a ring of substantially triangular cross section and immovably secured in the groove, one of the surfaces of the ring forming a wall of a piston ring groove, the piston ring groove having an inclined side wall and a piston ring having an inclined surface cooperating with the inclined wall of the piston ring groove, the ring comprising a plurality of ring sections, one of the ring sections having a plurality of splits.

In testimony whereof, I affix my signature.

HARRY B. JOHNSTON.